United States Patent
Negoro

(10) Patent No.: US 7,845,737 B2
(45) Date of Patent: Dec. 7, 2010

(54) BRAKING CONTROL APPARATUS AND BRAKING CONTROL METHOD FOR ELECTRIC VEHICLE

(75) Inventor: Hideto Negoro, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 817 days.

(21) Appl. No.: 11/667,591

(22) PCT Filed: Sep. 15, 2005

(86) PCT No.: PCT/JP2005/017046

§ 371 (c)(1),
(2), (4) Date: May 11, 2007

(87) PCT Pub. No.: WO2007/032073

PCT Pub. Date: Mar. 22, 2007

(65) Prior Publication Data

US 2008/0093916 A1   Apr. 24, 2008

(51) Int. Cl.
*B60T 13/00* (2006.01)

(52) U.S. Cl. .............................. 303/20; 303/3; 303/152; 701/81

(58) Field of Classification Search ..................... 303/3, 303/4, 15, 20, 127, 152; 701/70, 81
See application file for complete search history.

(56) References Cited

U.S. PATENT DOCUMENTS

2010/0049416 A1 * 2/2010 Harada .................. 701/81

FOREIGN PATENT DOCUMENTS

| JP | 6-253407 | 9/1994 |
|----|----------|--------|
| JP | 08-251706 | 9/1996 |
| JP | 11-059400 | 3/1999 |
| JP | 2005-033902 | 2/2005 |
| KR | 1999-022659 | 3/1999 |

OTHER PUBLICATIONS

International Search Report dated Dec. 9, 2005.

* cited by examiner

*Primary Examiner*—Pam Rodriguez
(74) *Attorney, Agent, or Firm*—Buchanan Ingersoll & Rooney PC

(57) ABSTRACT

A braking device that calculates an electric braking force command according to the braking command and generates a mechanical braking command, and a control circuit that calculates an electric braking force based on the electric braking force command from the device and the braking command and controls the power converter, are provided. The control circuit includes a control calculating unit that calculates the electric braking force and controls the converter, a virtual braking force calculating unit that calculates a virtual braking force to complement the electric braking force when starting braking, based on the braking command and an output of a voltage sensor for detecting an input voltage to the converter, and an adder that adds a calculation output of the control calculating unit and a calculation output of the virtual braking force calculating unit. The braking command from the device is changed according to an output of the adder.

3 Claims, 5 Drawing Sheets

BRAKING CONTROL APPARATUS AND BRAKING CONTROL METHOD FOR ELECTRIC VEHICLE

TECHNICAL FIELD

This invention relates to a braking control apparatus and braking control method for an electric vehicle that uses an electric brake based on an electric motor in combination with a mechanical brake such as air brake.

BACKGROUND ART

In an electric vehicle that uses an electric brake based on an electric motor in combination with a mechanical brake such as air brake, a braking system is generally used in which the electric brake is preferentially used when braking and the insufficient electric braking force to realize the braking force of the whole vehicle is supplemented by the mechanical braking. However, the electric brake based on the electric motor and the mechanical brake such as air brake differ in the response speed to a braking command. Therefore, particularly when starting braking, in order not to lower the comfortableness in riding, the electric braking force is outputted virtually and the action of the mechanical brake is restrained to prevent excessive braking forces. Thus, braking is started smoothly. (See, for example, Patent Reference 1.)

Patent Reference 1: JP-A-6-253407 (FIG. 1)

DISCLOSURE OF THE INVENTION

Problems that the Invention is to Solve

However, in the conventional braking control apparatus for an electric vehicle, the virtual braking force outputted at the time of starting braking is not outputted in accordance with the actual electric braking force, that is, the regenerative braking force. Therefore, in the case where there is no regenerative load, a dead time from the start of braking to the start of actual braking occurs. There is a problem that in spite of the driver's operating the brake in the electric vehicle, an idle running time occurs, during which braking of the vehicle does not work.

This invention is made in order to solve the problem as described above. It is an object of this invention to provide a braking control apparatus and braking control method for an electric vehicle that changes the magnitude of a virtual braking force if a regenerative load is small when starting braking so that there is little response delay to a braking force command from the driver's seat even in a state where the regenerative load is small.

Means for Solving the Problems

According to this invention, a braking control apparatus for an electric vehicle in which an AC motor is driven by a power converter fed with a DC wiring voltage, the power converter is controlled in accordance with a braking command from a driver's seat to actuate an electric brake based on the AC motor, and a lacking part of the electric braking force is supplemented by a mechanical brake, includes a braking device that calculates an electric braking force command in accordance with the braking command and generates a mechanical braking command, and a control circuit that calculates an electric braking force on the basis of the electric braking command from the braking device and the braking force command and controls the power converter. The control circuit includes a control calculating unit that calculates the electric braking force and controls the power converter, a virtual braking force calculating unit that calculates a virtual braking force to complement the electric braking force when starting braking, on the basis of the braking command and an output of a voltage sensor for detecting an input voltage to the power converter, and an adder that adds a calculation output of the control calculating unit and a calculation output of the virtual braking force calculating unit. The mechanical braking command from the braking device is changed in accordance with an output of the adder.

Also, according to this invention, a braking control method for an electric vehicle in which an AC motor is driven by a power converter fed with a DC wiring voltage, the power converter is controlled in accordance with a braking command from a driver's seat to actuate a regenerative brake based on the AC motor, and a lacking part of the electric braking force is supplemented by a mechanical brake, includes calculating a virtual braking force to complement the regenerative braking force when starting braking, changing the virtual braking force to reduce response delay to the braking command if a regenerative load is small, and changing the mechanical braking command along with the change in the virtual braking force.

ADVANTAGE OF THE INVENTION

According to this invention, in the electric vehicle that uses the electric brake in combination with the mechanical brake, when starting braking, braking control can be made with little response delay to the braking command from the driver's seat even in the state where the regenerative load is small.

BEST MODE FOR CARRYING OUT THE INVENTION

Embodiment 1

Figure 1:
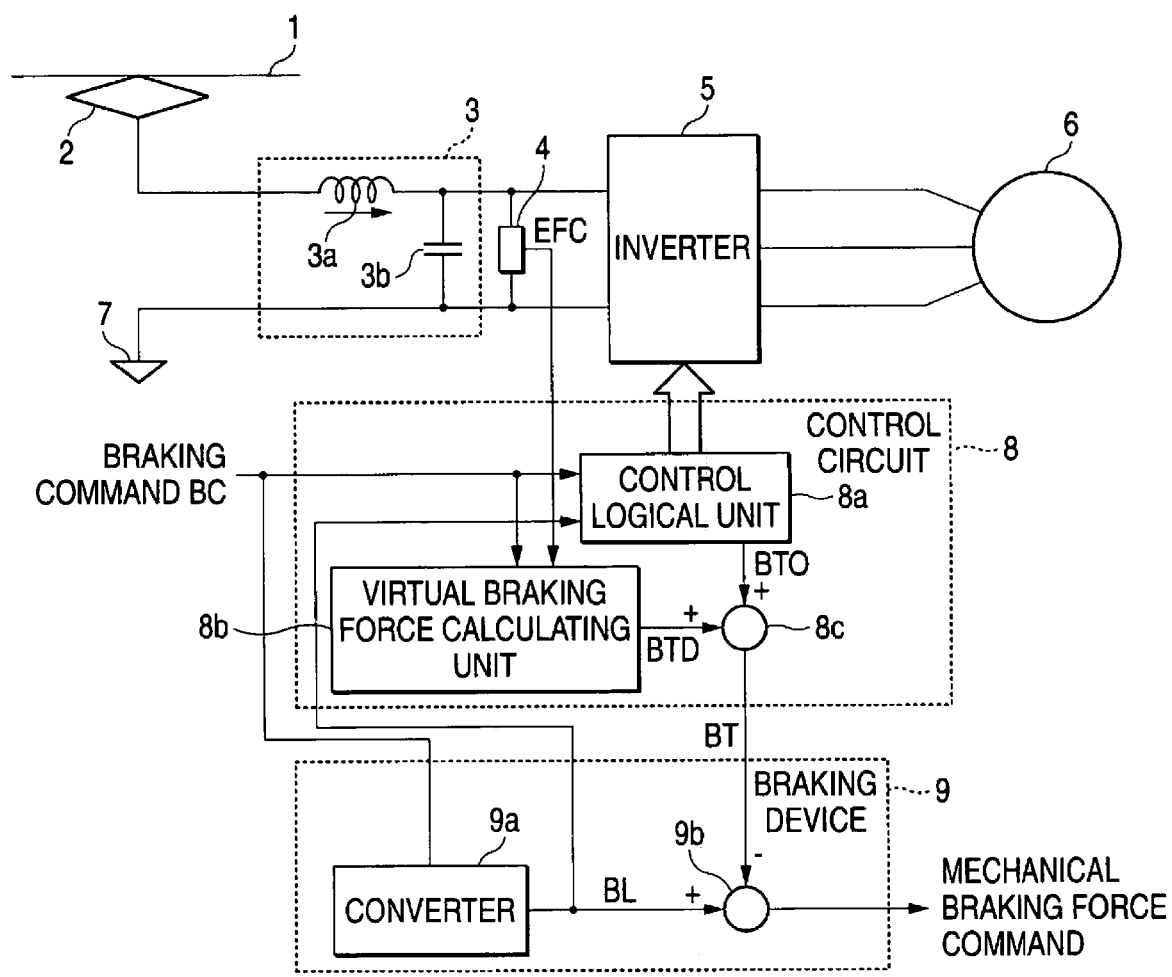
FIG. 1 is a structural block diagram showing a control apparatus for an electric vehicle according to Embodiment 1 of this invention.

FIG. 1 is a structural view showing the relation between a braking control apparatus for an electric vehicle and an AC motor according to Embodiment 1 of this invention. In FIG. 1, a DC voltage is inputted to an inverter 5, which is a power converter, from a wiring 1 via a current collector 2 and a filter circuit 3. In the filter circuit 3, 3a represents a reactor and 3b represents a filter capacitor. 7 represents ground potential.

A voltage sensor 4 is installed between the inverter 5 and the filter circuit 3. The voltage sensor 4 detects the voltage on the DC side of the inverter, that is, filter capacitor voltage, and outputs it to a control circuit 8. The inverter 5 converts DC power to AC power, or AC power to DC power, in accordance with a signal from the control circuit 8, and supplies an AC voltage to an AC motor 6, which is an induction motor or the like.

Here, as the inverter 5, a power converter formed by a semiconductor device and the like and controlled by, for example, the PWM (Pulse Width Modulation) control mode, may be used. These power converters output a pulse voltage under the PWM control and convert a DC voltage to an AC voltage having desired voltage amplitude and frequency.

In the control circuit 8, a control logical unit 8*a* outputs a switching signal to the semiconductor device forming the inverter 5 so that the inverter 5 is PWM-controlled in accordance with a braking command BC from a driver's seat and an electric braking force command BL from a braking device 9.

The control logical unit 8*a* also calculates a braking force equivalent to the actual generation torque of the AC motor 6, for example, from the motor current (not shown), or detects the braking force of the motor from a brake torque sensor (not shown), and outputs a first braking force BT0 to an adder 8*c*.

Moreover, a virtual braking force calculating unit 8*b* in the control circuit 8 generates a braking force dummy signal BTD for generating a virtual braking force to complement the electric braking force, from the braking command BC and the filter capacitor voltage inputted from the voltage sensor 4, and outputs it to the adder 8*c*. The adder 8*c* adds the first braking force BT0 and the braking force dummy signal BTD and outputs the result as a second braking force BT to the braking device 9.

The braking device 9 calculates an electric braking force command BL from the braking command by using a table preset in a converter 9*a* and outputs the result to the control circuit 8 and a subtractor 9*b*. The subtractor 9*b* subtracts the second braking force BT from the electric braking force command BL and outputs the result as a mechanical braking command.

Figure 2:
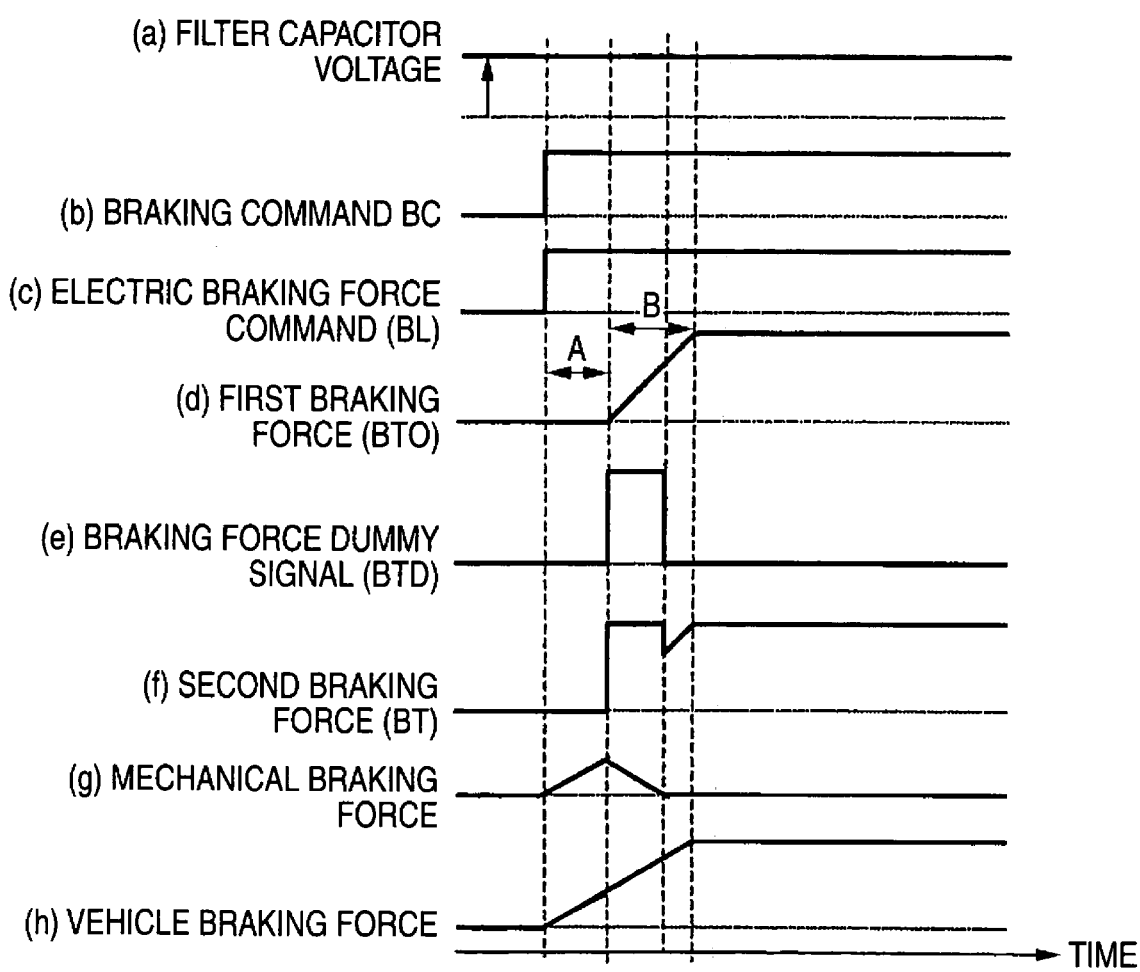
FIG. 2 is a waveform view of each part for explaining a first operation at the time of braking in FIG. 1.
Figure 3:
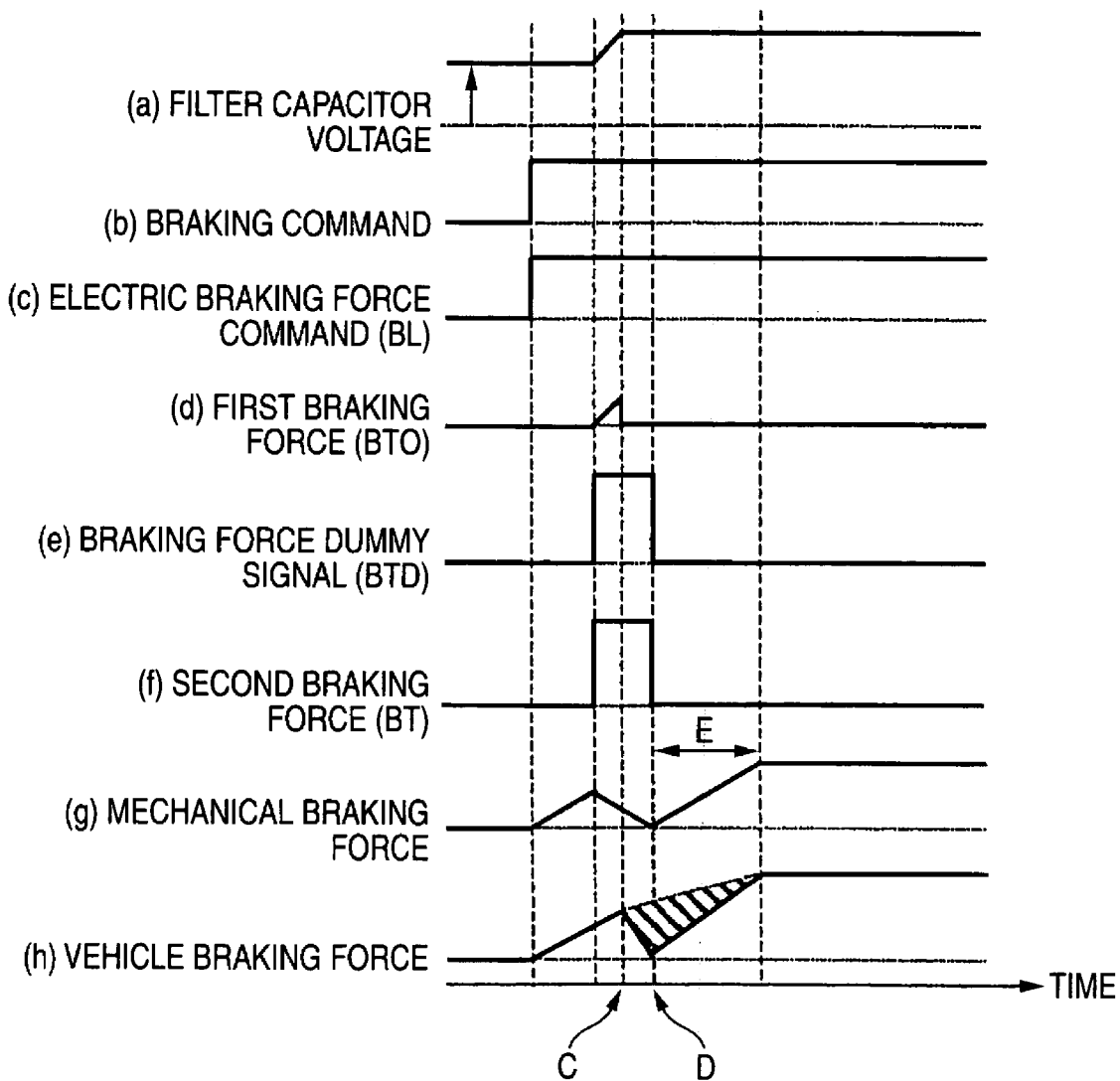
FIG. 3 is a waveform view of each part for explaining a second operation at the time of braking in FIG. 1.
Figure 4:
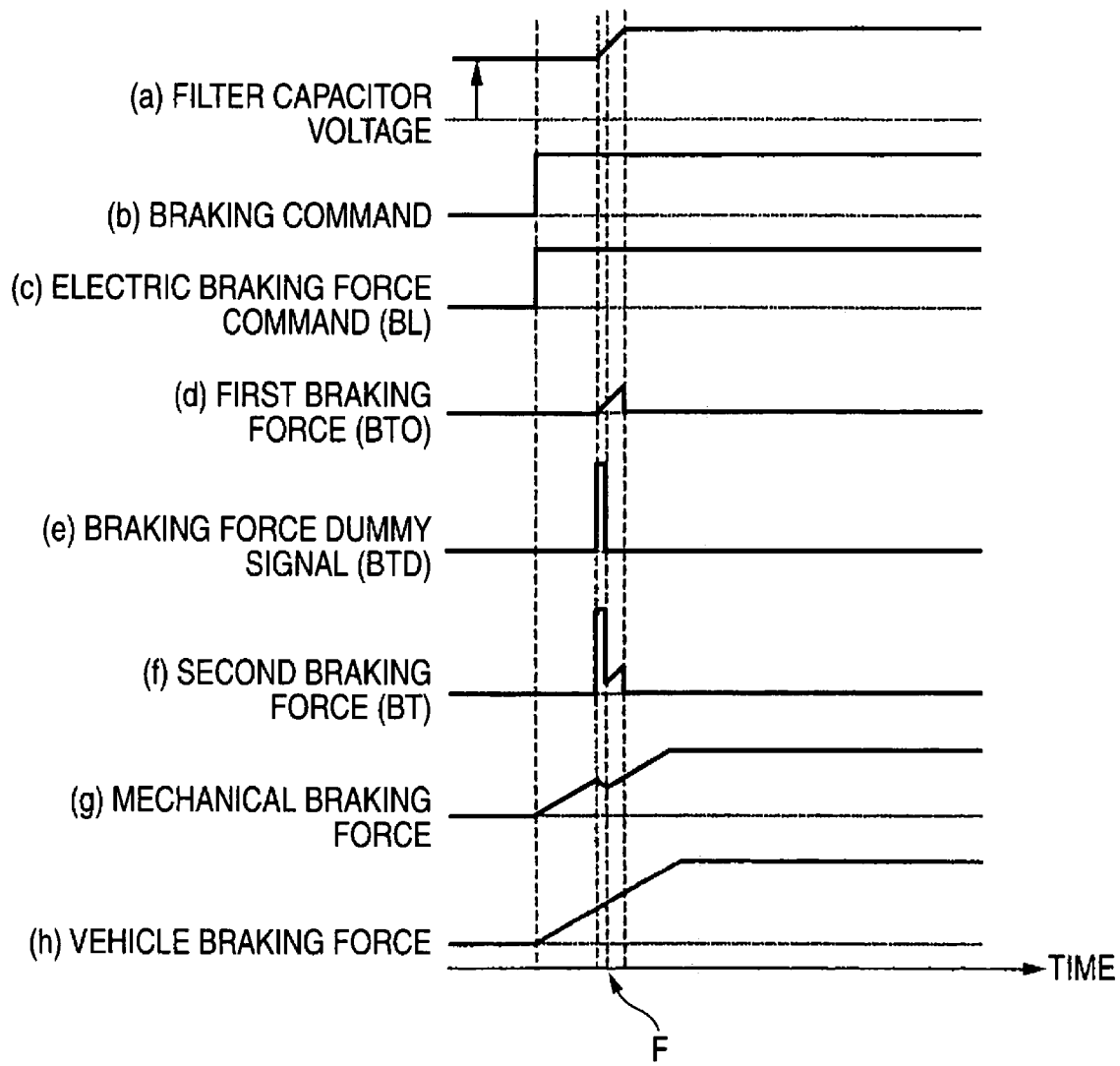
FIG. 4 is a waveform view of each part for explaining a third operation at the time of braking in FIG. 1.

Next, the operation of the braking control apparatus for the electric vehicle of FIG. 1 with reference to FIGS. 2 to 4.

To further clarify the advantage of the invention, first, a case where there is a regenerative load and the electric brake functions sufficiently when braking will be described with reference to FIG. 2.

In the control circuit 8, the control logical unit 8*a* controls the inverter 5 so that the electric brake acts in accordance with the braking command BC from the driver's seat (FIG. 2*b*) and the electric braking force command BL from the braking device 9 (FIG. 2*c*). Moreover, a braking force equivalent to the actual generation torque of the motor is outputted as the first braking force BT0 (FIG. 2*d*). In the control circuit 8, a delay time from the reception of the braking command BC to the actual action of the electric brake (section A) occurs because of the preparation for operating the inverter, and a jerk (section B) is provided for smoothly starting up the electric brake in order not to lower the comfortableness in riding.

In the case where there is a sufficient regenerative load, the filter capacitor voltage (FIG. 2*a*) does not rise and the electric braking force rises up as commanded. Therefore, the braking force BT0 of the motor rises up as shown in FIG. 2*d*. Moreover, in order to avoid overlap of the electric brake and the mechanical brake when starting braking, the braking force dummy signal BTD, which is a virtual braking force, is outputted as shown in FIG. 2*e*. As a result, the adder 8*c* adds the braking force BT0 of the motor and the braking force dummy signal BTD and outputs the second braking force BT to the braking device, as shown in FIG. 2*f*. While the braking force dummy signal BTD is provided stepwise here, a ramp function or the like may be used.

On the other hand, in the braking device 9, when the braking command BC is inputted, since the second braking force BT remains zero during the action delay of the electric brake, the subtractor 9*b* calculates the insufficiency of the second braking force BT to realize the electric braking force command BL and outputs the complementary amount as a mechanical braking force command. Generally, an air brake is used as the mechanical brake and it has response delay because of its characteristics. Therefore, the actual braking force increases as shown in FIG. 2*g*.

When starting braking, as a result of the above-described action, the braking force of the vehicle changes as shown in FIG. 2*h* and smooth start of braking can be realized without lowering the comfortableness in riding.

Next, a case where there is no regenerative load at the time of braking will be described with reference to FIG. 3.

In the case where there is no regenerative load, when the electric brake is started up, the filter capacitor voltage increases, as shown in FIG. 3*a*. Since the semiconductor device forming the inverter 5 may be damaged if the filter capacitor voltage continues to increase, the control circuit 8 limits the electric braking force when the filter capacitor voltage reaches a preset value or higher. As a result, even in the case where the braking command BC exists as in FIG. 2, the first braking force BT0 equivalent to the electric braking force is throttled down to zero when the filter capacitor voltage reaches the preset value or higher, as shown in FIG. 3*d*. In such a case, if virtual braking force calculating unit 8*b* outputs the braking force dummy signal BTD as in FIG. 2, the electric braking force is throttled down. Therefore, the degree of deceleration of the vehicle is lowered at point C, as shown in FIG. 3*h*. Then, at point D where the braking force dummy signal BTD becomes zero, the first braking force BT0 equivalent to the electric braking force is zero. Since the second braking force BT becomes zero, too, the second braking force BT is insufficient for the electric braking command BL, and the mechanical brake rises up at point D in order to supplement the lacking part of the electric braking force. As described above, since the mechanical brake has response delay because of its characteristics, the mechanical braking changes as shown in FIG. 3*g* (section E). Therefore, the braking force of the vehicle, that is, degree of deceleration, is as indicated by the solid line in FIG. 3*h* and the part equivalent to the broken line in FIG. 3*h* is actually a non-braking state. Thus, there is a problem that in spite of the driver's operating the brake, braking does not work.

Thus, to solve the problem as shown in FIG. 3 even in the state where there is no regenerative load, the filter capacitor voltage is detected by the voltage sensor 4 and the braking force dummy signal BTD is calculated in accordance with the filter capacitor voltage. The operation in this case will be described with reference to FIG. 4.

Figure 5:
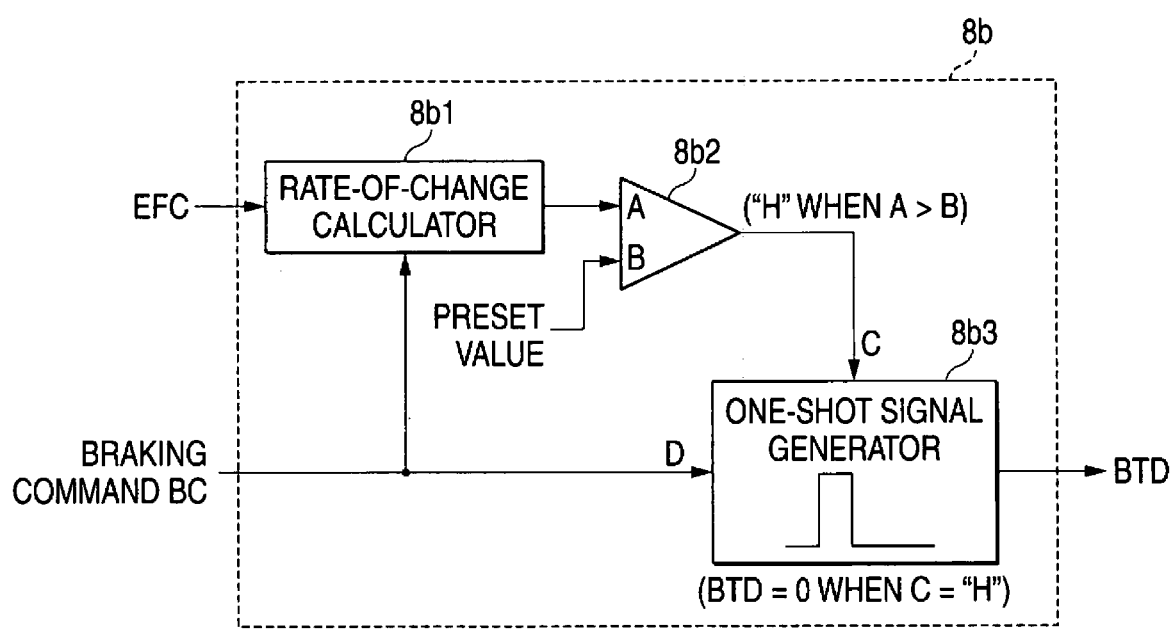
FIG. 5 is a block diagram showing a schematic structure of a virtual braking force calculating unit shown in FIG. 1.

In the case where there is no regenerative load, when the electric brake is started up, the filter capacitor voltage increases, as in FIG. 3. The virtual braking force calculating unit 8*b* monitors the filter capacitor voltage EFC as shown in FIG. 5. After the braking command BC is inputted, for example, the filter capacitor voltage is calculated, and if the rate of change in the voltage exceeds a preset value, it is judged that there is no regenerative load (comparator output C is H) by using a rate-of-change calculator 8*b*1 and a comparator 8*b*2. The braking force dummy signal BTD is reduced to zero as shown in FIG. 4*e* via a one-shot signal generator 8*b*3. As a result, the second braking force BT changes as shown in FIG. 4*f*. Therefore, the braking device judges that the second braking force BT is insufficient for the electric braking command BL at point F, and starts up the mechanical brake at point F in order to supplement the lacking part of the electric braking force.

As a result, the braking force of the vehicle, that is, degree of deceleration, is as shown in FIG. 4*h*. The state that the degree of deceleration becomes insufficient and the non-braking exists as shown in FIG. 3 is resolved. The degree of deceleration as operated by the driver is provided for the vehicle.

As described above, according to Embodiment 1, a braking control apparatus and braking control method for an electric vehicle can be realized in which the magnitude of the virtual braking force is changed if a regenerative load is small when starting braking so that there is little response delay to a braking force command from the driver's seat even in the state where the regenerative load is small.

DESCRIPTION OF REFERENCE NUMERALS AND SIGNS

1 wiring, 2 current collector, 3 filter circuit, 3a filter reactor, 3b filter capacitor, 4 voltage sensor, 5 inverter, 6 AC motor, 7 ground potential, 8 control circuit, 8a control logical unit, 8b virtual braking force calculating unit, 8c adder, 9 braking device, 9a converter, 9b subtractor

The invention claimed is:

1. A braking control apparatus for an electric vehicle in which an AC motor is driven by a power converter fed with a DC wiring voltage, the power converter is controlled in accordance with a braking command from a driver's seat to actuate an electric brake based on the AC motor, and a lacking part of an electric braking force is supplemented by a mechanical brake, the braking control apparatus comprising
- a braking device that calculates an electric braking force command in accordance with the braking command and generates a mechanical braking command, and
- a control circuit that calculates the electric braking force on the basis of the electric braking force command from the braking device and the braking command and controls the power converter,
- wherein the control circuit includes a control calculating unit that calculates the electric braking force and controls the power converter,
- a virtual braking force calculating unit that calculates a virtual braking force to complement the electric braking force when starting braking, on the basis of the braking command and an output of a voltage sensor for detecting an input voltage to the power converter, and
- an adder that adds a calculation output of the control calculating unit and a calculation output of the virtual braking force calculating unit, and
- wherein the mechanical braking command from the braking device is changed in accordance with an output of the adder.

2. The braking control apparatus for an electric vehicle as claimed in claim 1, wherein the voltage sensor detects a filter capacitor voltage of a filter circuit provided on DC side of the power converter.

3. A braking control method for an electric vehicle in which an AC motor is driven by a power converter fed with a DC wiring voltage, the power converter is controlled in accordance with a braking command from a driver's seat to actuate a regenerative brake based on the AC motor, and a lacking part of the electric braking force is supplemented by a mechanical brake, the method comprising
- calculating a virtual braking force to complement the regenerative braking force when starting braking, on the basis of the braking command and an output of a voltage sensor for detecting an input voltage to the power converter,
- changing the virtual braking force to reduce response delay to the braking command if a regenerative load is small, and
- changing the mechanical braking command along with the change in the virtual braking force.

* * * * *